Figure 1:
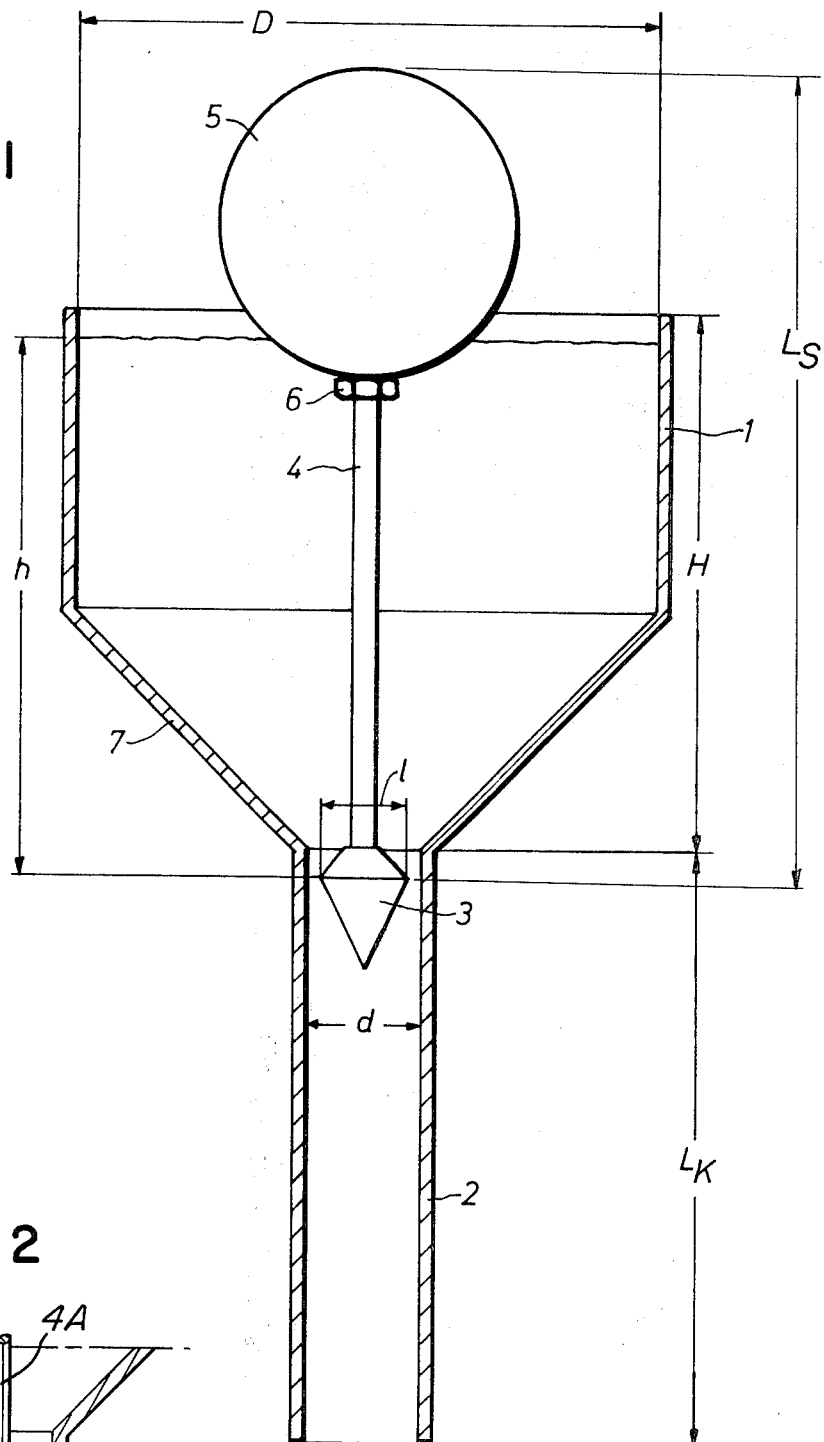

United States Patent
Frenken et al.

[11] B 3,982,665
[45] Sept. 28, 1976

[54] OUT-FLOW METERING DEVICE

[75] Inventors: Hans Frenken; Georg Schindler, both of Leverkusen; Josef Friedsam, Langenfeld, all of Germany

[73] Assignee: AGFA-Gevaert, A.G., Leverkusen, Germany

[22] Filed: Nov. 6, 1974

[21] Appl. No.: 521,480

[44] Published under the second Trial Voluntary Protest Program on January 13, 1976 as document No. B 521,480.

[30] Foreign Application Priority Data
Nov. 9, 1973 Germany............................ 2356010

[52] U.S. Cl. ............................................... 222/67
[51] Int. Cl.² ......................................... B67D 5/08
[58] Field of Search ................ 137/398, 8; 222/55, 222/52, 67, 56

[56] References Cited
UNITED STATES PATENTS
| | | | |
|---|---|---|---|
| 421,559 | 2/1890 | Cumberbatch | 137/398 X |
| 3,025,880 | 3/1962 | Anderson | 137/398 X |

*Primary Examiner*—Robert B. Reeves
*Assistant Examiner*—John P. Shannon
*Attorney, Agent, or Firm*—Connolly and Hutz

[57] ABSTRACT

A constant stream of liquid per unit of time is dispensed under normal pressure from a storage vessel by means of a metering element which is rigidly connected to a float and whose diameter is smaller than the internal diameter of the outflow pipe or tube, the vertical position of the metering element changing with the liquid level in the storage vessel.

11 Claims, 2 Drawing Figures

OUT-FLOW METERING DEVICE

This invention relates to an outflow-metering device for a storage vessel for dispensing a constant stream of liquid per unit of time under normal pressure. In many cases, one liquid has to be added to another liquid or to a solids substance from an open storage vessel in a stream of constant volume per unit of time. A metering pump is normally used for this purpose. Regulating valves are also used, their through-flow cross-section being reduced accordingly through a level gauge and regulating circuit. Apart from the expense involved, systems of this kind require frequent maintenance which involves interrupting the operation in which they are being used.

An object of the invention is to provide a simple, automatic outflow-metering device which always dispenses a constant volume of liquid irrespective of the liquid level in the storage vessel.

According to the invention there is provided an outflow-metering device for a storage vessel for dispensing a constant stream of liquid per unit of time under normal pressure, comprising a float and a metering element rigidly connected thereto which has a smaller diameter than the internal diameter of the outflow pipe or tube, the vertical position of the metering element in the outflow pipe thereby changing with the liquid level in the storage vessel.

The cross-section of the gap between the metering element and the inner wall of the outflow pipe and the float/metering element interval determine the metering rate. Accordingly, the metering rate remains constant even when the liquid level in the storage vessel changes.

In one advantageous embodiment of the invention, the distance between the float and metering element is adjustable by means of an adjusting screw which enables the metering rate to be varied.

The storage vessel is preferably in the form of a tube whose diameter is not more than 10 percent greater than the diameter of the float. The float is then guided in the storage vessel and cannot be deflected to one side. In principle, the metering element can be of any shape, for example it can be spherical or in the form of a double cone. However, a metering element in the form of a flat disc has proved to be particularly effective, because in this case the metering rate is substantially independent of the viscosity of the liquid. In one advantageous embodiment of the invention, the geometric form of the float is adapted to the shape of the base of the storage vessel in the vicinity of the outlet pipe. By virtue of this configuration, the metering rate remains substantially constant until the storage vessel has been almost completely emptied, and then falls suddenly to zero.

The main advantages of the invention are its simplicity and the compactness of the structure of the metering device. There is no need for any additional regulating and control elements. The service life of the metering device according to the invention is virtually unlimited, because there is no wear on moving parts.

Figure 2:
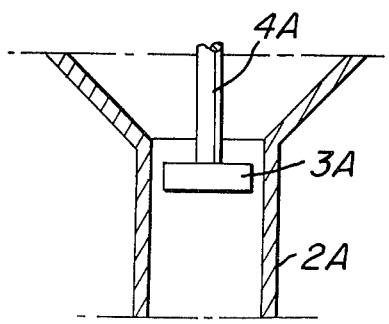

One embodiment of the invention is further described by way of example below with reference to the accompanying drawings in which:

FIG. 1 is a front view in elevation partly in cross-section of one embodiment of this invention; and FIG. 2 is a fragment of a front view in elevation partly in cross-section of another embodiment of this invention.

FIG. 1 shows a storage vessel 1 with an outflow pipe 2. A double cone-shaped metering element 3 therefor is fixed to a float 5 in the form of a hollow sphere by means of a connecting rod 4. The distance between the metering element and the float and hence the metering rate can be varied by means of an adjusting screw 6. The storage vessel 1 has an upper cylindrical portion and a lower tapering portion 7 which leads into the outflow pipe or tube 2. The diameter 2R of the float is at most only 10 percent smaller than the diameter D of the storage vessel. In this way, the float 5 is guided in the storage vessel 1. The tapering portion 7 at the bottom of the storage vessel 1 defines an angle of approximately 90° at the apex thereof. The length $L_K$ of the outflow pipe 2 is preferably greater than the overall height of the storage vessel 1 and the tapering portion 7. The dimensions of the float 5 must be such that it only dips to a limited extent into the liquid level of the storage vessel 1.

In one particularly favourable embodiment, the underneath of the float 5 is adapted to the tapering portion 7. In this way, the metering rate remains substantially constant until the storage vessel 1 has been almost completely emptied, and then falls suddenly to zero.

In FIG. 2 is shown a portion of outflow pipe 2A of apparatus similar to that as shown in FIG. 1 with the exception that metering element 3A is a substantially flat disc. This makes the metering rate substantially independent of the viscosity of the liquid.

The largest diameter part of the metering element 3 defines with the inner wall of the outlet pipe 2 a free annular gap whose cross-sectional area F remains constant irrespective of the particular vertical or lateral position of the metering element. The rate of flow of the liquid through the annular gap is approximately determined by the equation $$\dot{w} = \sqrt{2g \cdot h,}$$

where $h$ is the interval between the largest diameter part of the metering element 3 and the liquid level in the storage vessel 1, and $g$ the acceleration due to gravity. It can readily be seen that $h$ remains constant irrespective of the particular liquid level in the storage vessel 1, and accordingly, the relation $F \cdot \dot{w} =$ constant holds for the metering device. The volume of liquid dispensed per unit of time is thus $\dot{V} = F \cdot \dot{w} \cdot \alpha =$ constant, $\alpha$ being the so-called contraction factor which takes into account the effective reduction in cross-section at the annular gap F $(0.5 \leq \alpha \leq 1)$.

In the case of real, Newtonian liquids, the dispensed volume V only remains constant as long as the viscosity of the liquid remains constant. If, however, a flat cylindrical disc is used as the metering element 3, liquids can be metered substantially irrespective of viscosity over a wide range. The disc can be between 1 and 3 mm thick. The annular gap between the metering element and the inner wall of the outflow pipe 2 should be greater than 0.2 mm.

Within the wide limits the parameters of the metering device are not critical. In practice, the dimensions of the metering device are best based on the following rules:

$H/D < 1$; $100(L_k + 2R - L_s)/L_k \geq 5$;
$L_k > H$; $100(D - 2R)/D \leq 10$; $h \geq H$ in which:

$H$ = the overall height of the storage vessel 1, including the tapering portion 7,
$h$ = the level of liquid above the annular gap around the metering element,
$D$ = diameter of storage vessel 1
R  $R$  float radius
$L_s$ = distance from the top of the float to the annular gap between the metering element 3 and the outflow pipe 2,
$L_k$ = length of the outflow pipe, The first formula says in effect that the length $L_k$ of the outflow pipe 2 should always be so great that the metering element 3 still remains within the outflow pipe 2 even at the lowest liquid level in the supply vessel 1. The second formula applies to the diameter of the float. The float diameter should only be slightly smaller than the internal diameter of the storage vessel 1 to prevent wobbling of the metering unit.

What we claim is:

1. An outflow-metering device for a storage vessel for dispensing a constant stream of liquid per unit of time, comprising an outflow tube connected to the bottom of the storage vessel, a float and a metering element rigidly connected thereto which has a smaller diameter than the internal diameter of the outflow tube, the float being disposed in the storage vessel with the metering element disposed in the outflow tube, whereby the vertical position of the metering element in the outflow tube changes with the liquid level in the storage vessel and remains at a constant distance from the float to provide a substantially constant volume of flow of liquid from the outflow tube while sufficient liquid remains in the storage vessel to support the float.

2. A device as claimed in claim 1, wherein the distance between the float and the metering element and hence the metering rate is adjustable by means of an adjusting screw for adjusting the rate of flow.

3. A device as claimed in claim 1 wherein the float having a diameter, the storage vessel comprises a cylindrical portion having a diameter whose diameter is at most 10 percent greater than the diameter of the float, so that the float is guided in the storage vessel.

4. A device as claimed in claim 1 wherein the metering element is in the form of a flat disc.

5. A device as claimed in claim 1 wherein the shape of the float is spherical and the shape of the base of the storage vessel in the vicinity of the outlet is a funnel whereby the float may be inserted within the base.

6. A device as claimed in claim 5 wherein the part of the storage vessel joined to the outflow tube is tapered.

7. A device as claimed in claim 1 wherein the storage vessel is cylindrical having a tapered junction with the outflow tube, and the ratio of its overall height to its overall diameter is less than one.

8. A device as claimed in claim 7 wherein the length of the outflow tube is designated $L_K$, the float is round having a radius, the radius of the float is designated $R$, the distance from the top of the float to the annular gap between the metering element and the outflow tube is designated $L_S$ and the aforementioned elements have the following relationship;
$$100 (L_K + 2R - L_s)L_k \geq 5.$$

9. A device as claimed in claim 8 wherein the elements also have the relationship:
$$L_k > H.$$
wherein $H$ is the overall height of the storage vessel.

10. A device as claimed in claim 9, wherein $D$ is the overall diameter of the storage vessel and the elements have the following relationship:
$$100(D - 2R)/D \leq 10.$$

11. A device as claimed in claim 10, wherein $h$ designates the level of the liquid above the annular gap around the metering element and the elements have the relationship:
$$h \geq H.$$

* * * * *